United States Patent
Henryson et al.

(10) Patent No.: US 12,321,948 B2
(45) Date of Patent: Jun. 3, 2025

(54) MACHINE-LEARNING PREDICTIVE MODELS FOR CLASSIFYING RESPONSES TO AND OUTCOMES OF END-USER COMMUNICATIONS

(71) Applicant: Wells Fargo Bank, N.A., San Francisco, CA (US)

(72) Inventors: Stacy R. Henryson, Clive, IA (US); Nikhil Jog, San Francisco, CA (US); Brian Karp, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/230,853

(22) Filed: Aug. 7, 2023

(65) Prior Publication Data
US 2023/0376970 A1 Nov. 23, 2023

Related U.S. Application Data

(63) Continuation of application No. 17/121,479, filed on Dec. 14, 2020, now Pat. No. 11,720,903.

(51) Int. Cl.
| | |
|---|---|
| *G06Q 30/016* | (2023.01) |
| *G06F 16/28* | (2019.01) |
| *G06F 40/166* | (2020.01) |
| *G06F 40/205* | (2020.01) |
| *G06F 40/279* | (2020.01) |

(Continued)

(52) U.S. Cl.
CPC ......... *G06Q 30/016* (2013.01); *G06F 16/285* (2019.01); *G06F 40/166* (2020.01); *G06F 40/205* (2020.01); *G06F 40/279* (2020.01); *G06N 3/042* (2023.01); *G06N 3/08* (2013.01)

(58) Field of Classification Search
CPC ...... G06Q 30/016; G06Q 10/10; G06Q 40/02; G06F 16/285; G06F 40/166; G06F 40/205; G06F 40/279; G06N 3/0427; G06N 3/08
See application file for complete search history.

(56) References Cited

U.S. PATENT DOCUMENTS

| | | | |
|---|---|---|---|
| 7,529,689 B2 * | 5/2009 | Rowan | G06Q 50/188 705/26.1 |
| 10,097,690 B1 * | 10/2018 | Henry | H04M 3/5183 |
| 10,498,888 B1 * | 12/2019 | Rute | G06N 20/00 |

(Continued)

*Primary Examiner* — Keith D Bloomquist
(74) *Attorney, Agent, or Firm* — Foley & Lardner LLP

(57) ABSTRACT

A service provider computing system includes memory having stored thereon instructions that, when executed by one or more processors, cause the one or more processors to obtain a first set of complaint logs corresponding to one or more user complaints, each complaint log including a resolution comments field providing a textual representation of a resolution for a corresponding complaint log, parse the resolution comments field of each complaint log of the first set of complaint logs to identify one or more key terms, and execute a machine-learning predictive model using the one or more key terms to generate, for each complaint log, a prediction indicating whether a corresponding complaint should have compensation, the machine-learning predictive model being a supervised machine learning model configured to accept the parsed resolution comments field for the first set of complaint logs as inputs and to output the prediction for each complaint log.

18 Claims, 8 Drawing Sheets

(51) Int. Cl.
    *G06N 3/042*           (2023.01)
    *G06N 3/08*            (2023.01)

(56) References Cited

U.S. PATENT DOCUMENTS

| | | | |
|---|---|---|---|
| 10,558,925 B1* | 2/2020 | Flor | G06N 5/047 |
| 2015/0348051 A1* | 12/2015 | Bodda | G06Q 30/016 |
| | | | 705/304 |
| 2016/0321684 A1* | 11/2016 | Chen | G06Q 30/0202 |
| 2017/0024640 A1* | 1/2017 | Deng | G06N 3/04 |
| 2017/0154292 A1* | 6/2017 | Venkataraman | |
| | | | G06Q 10/063114 |
| 2017/0316438 A1* | 11/2017 | Konig | G06Q 30/01 |
| 2018/0285768 A1* | 10/2018 | Karuppasamy | G06N 20/00 |
| 2019/0392538 A1* | 12/2019 | So | G06Q 50/182 |
| 2020/0134012 A1* | 4/2020 | Zakharov | G06Q 10/20 |
| 2021/0158805 A1* | 5/2021 | Sivasubramanian | |
| | | | G06F 40/279 |
| 2021/0280207 A1* | 9/2021 | Pisczak | G10L 25/48 |
| 2022/0051128 A1* | 2/2022 | Ristoski | G06Q 30/0202 |
| 2022/0191154 A1* | 6/2022 | Truong | G06F 40/30 |

* cited by examiner

Caller Information

Adam Smith
100 Main St.
Springfield, AK

[ Answer ]

[ Transfer ]

Complaint Resolution Script

[Hello Mr. Smith....]
[Discuss ...]

( REC )

Compensation

User Account #: 123456789
Account Type: Relief
Amount: $ 50.00

[ Submit ]  [ Cancel ]

Previously Resolved Complaints

Complaint #1 – 12/12/2019 00:00 CST
Complaint #2 – 12/12/2019 00:12 CST
Complaint #3 – 12/12/2019 00:27 CST

Complaint Log

Product: [ Selection(s) ▶ ]

Category: [ Selection(s) ▶ ]

Type: [ Selection(s) ▶ ]

Resolution: [ Selection(s) ▶ ]

Compensation Provided: $ 0.00

Comments:
*Enter resolution comments here.*

[ Submit ]  [ Save ]  [ Cancel ]

MACHINE-LEARNING PREDICTIVE MODELS FOR CLASSIFYING RESPONSES TO AND OUTCOMES OF END-USER COMMUNICATIONS

CROSS-REFERENCE TO RELATED APPLICATIONS

This application is a continuation of U.S. patent application Ser. No. 17/121,479 filed Dec. 14, 2020, the entirety of which is incorporated herein by reference.

BACKGROUND

It is not uncommon for companies, particularly companies that provide some sort of good or service to an end-user, to provide service support to the end-users. Service support may be provided in a wide variety of ways. For example, a user may contact a service hotline (e.g., via a user device), fill out an online form or send an email, write a letter, etc. Users may contact a company for any number of reasons, such as to provide positive feedback regarding a product or service, for technical support, for additional information, and the like. However, in some cases, users may contact a company with a complaint or grievance regarding a product or service. For example, a user may contact user service to report a faulty product or to complain about the quality of a rendered service.

Service providers, for example, may field user complaints regarding charges made to a user's account (i.e., fees). For example, a user's bank account may sometimes be charged an overdraft fee in response to a payment, transfer, or withdrawal that exceeds an available amount of funds. In another example, a user may mistakenly use or sign-up for a service that incurs a charge (e.g., a monthly charge). Users may call to "complain" or to dispute these charges. The service provider may provide some sort of compensation (e.g., monetary relief) in response to these user complaints, such as reimbursing an overdraft fee that may be in error or as a courtesy to the user.

In many instances, user complaints are handled by service representatives using various software that tracks complaints and records annotations, comments, and metadata. Providing compensation (e.g., refunding fees) is often left to a service representative's discretion. However, human error can result in an incomplete understanding of when and how to provide compensation in response to particular complaints. It may also be difficult to ensure that users are being equitably compensated for similar types of complaints, and to avoid over-compensating users. Further, it would be beneficial to ensure that service representatives are not missing cases in which a user should receive some sort of monetary compensation.

SUMMARY

Various embodiments relate to a service provider computing system. The service provider computing system includes memory having stored thereon instructions that, when executed by one or more processors, cause the one or more processors to obtain a first set of complaint logs corresponding to one or more user complaints, each complaint log of the first set of complaint logs including a resolution comments field and an indication whether compensation was provided, the resolution comments field providing a textual representation of a resolution for a corresponding complaint log, parse the resolution comments field of each complaint log of the first set of complaint logs to identify one or more key terms, and execute a machine-learning predictive model using the one or more key terms to generate, for each complaint log, a prediction indicating whether a corresponding complaint should have compensation, the machine-learning predictive model being a supervised machine learning model configured to accept the parsed resolution comments field for the first set of complaint logs as inputs and to output the prediction for each complaint log.

Various embodiments relate to a method. The method includes receiving a complaint from a user, recording at least a text-based description of the complaint, including an indication of a resolution for the complaint, parsing the text-based description of the complaint to generate a matrix of key terms within the text-based description, executing a machine-learning predictive model using the matrix of key terms to generate, for the complaint, a prediction indicating whether the complaint should have compensation, and presenting, via a user interface, an indication of the prediction.

Various other embodiments relate to a method. The method includes obtaining a first set of complaint logs corresponding to one or more user complaints, each complaint log of the first set of complaint logs including a resolution comments field and an indication whether compensation was provided, the resolution comments field providing a textual representation of a resolution for a corresponding complaint log, parsing the resolution comments field of each complaint log of the first set of complaint logs to identify a first set of key terms, training a machine-learning predictive model using the first set of key terms, the machine-learning predictive model being a supervised machine learning model configured to accept the parsed resolution comments field for the first set of complaint logs as inputs and to output a probability, for each of the first set of complaint logs, that a corresponding user complaint should have compensation, the machine-learning model comprising a sequential neural network, obtaining a second set of complaint logs corresponding to one or more additional user complaints, parsing a resolution comments field of each complaint log of the second set of complaint logs to determine a frequency the each term of first set of key terms appears in the resolution comments fields of the second set of complaint logs, and executing the trained machine-learning predictive model based on the second set of complaint logs to generate, for each of the second set of complaint logs, a probability that a corresponding user complaint should have compensation.

BRIEF DESCRIPTION OF THE DRAWINGS

Objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIGS. 6A and 6B are example user interfaces presented to a service provider service representative to resolve user complaints, according to some embodiments.

DETAILED DESCRIPTION

Referring generally to the figures, systems and methods for applying machine-learning predictive models and classifiers to analysis of user complaints to evaluate responses to or outcomes of the complaints are shown, according to various embodiments. A service provider computing system (or other enterprise computing system) can receive user complaint logs from, for example, a software application executing on a service representative's computing device. The service provider computing system can perform natural language processing on the complaint logs to extract one or more key words, and can subsequently execute a trained predictive model to determine, for each complaint log, whether compensation should have been provided. The predictive model can output complaint resolution predictions. These predictions can be compared to actual complaint resolutions to aid in auditing and to ensure that each end-user is being adequately and equitably treated. In some embodiments, user complaints may be analyzed "live" (i.e., in real-time or near real-time during ongoing communications with a user), such as by recognizing and transcribing audio of a phone call received by a representative computing device, to ensure uniformity in compensation decisions among representatives and to reduce human error. In various embodiments, the systems and methods described herein may also be utilized for communications other than user complaints, to determine if monetary relief should be or should have been provided in other scenarios. For example, a user may contact a service representative for information without submitting a complaint. In another example, a user and a service representative (e.g., a person, a chat bot) may communicate during a live or automated advising session. In either case, the communication (e.g., a chat and/or text data, an audio recording, etc.) may be analyzed to determine if monetary relief can, or should, be provided.

Figure 1:
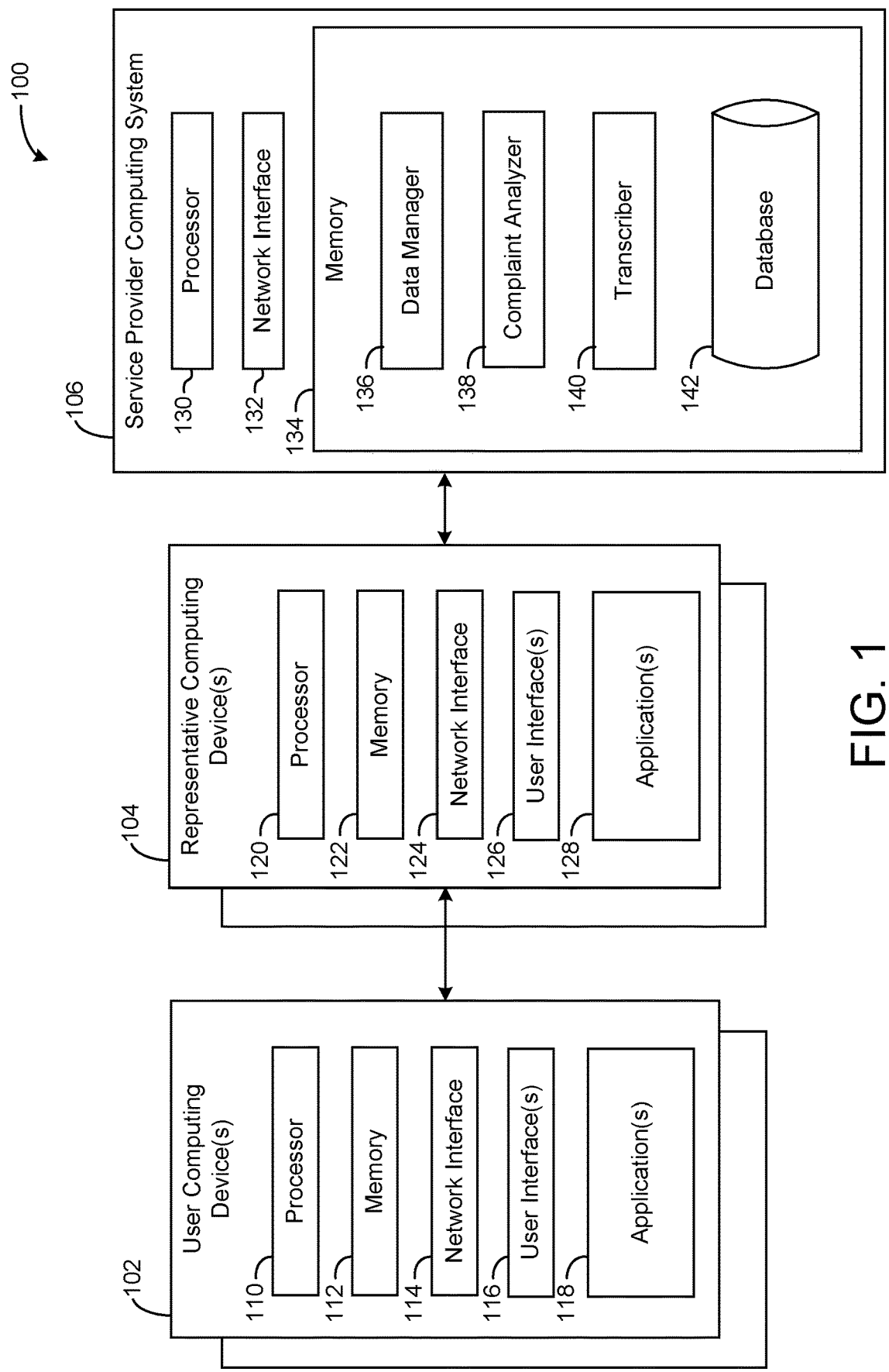
FIG. 1 is a block diagram of a computing system for processing user complaints, according to some embodiments.

Referring now to FIG. 1, a block diagram of a computing system 100 for processing user complaints is shown, according to some embodiments. As shown, system 100 can include a plurality of user computing devices 102 and representative computing devices 104 communicating with a service provider computing system 106. In some embodiments, user computing devices 102, representative computing devices 104, and service provider computing system 106 may be communicably coupled via one or more networks. For example, user computing devices 102 may communicate with representative computing devices 104 via a telephone (e.g., cellular) network, such as when an end-user utilizes their user computing device 102 to calls a service representative computing device 104. As another example, representative computing devices 104 may communicate with service provider computing system 106 via an internal wired or wireless network. In this regard, the network(s) connecting the components of system 100 may be any suitable type of type of wireless or wired network (e.g., Internet, intranet, VPN, etc.) configured to exchange of data, values, instructions, messages, and the like between user computing devices 102, representative computing devices 104, and service provider computing system 106.

In some embodiments, user computing devices 102 may include any sort of mobile or non-mobile computing devices that may be utilized by a user (e.g., an end-user of a product, service, etc.) to contact a service representative. For example, user computing devices 102 can include smartphones or other mobile phones, tablets, laptops, smart devices (e.g., smart speakers), desktop computers, workstations, etc. Each user computing device 102 is shown to include a processor 110, a memory 112, a network interface 114, and one or more user interfaces 116. In various embodiments, processor 110 is implemented as a general-purpose processor, an application specific integrated circuit (ASIC), one or more field programmable gate arrays (FPGAs), a digital signal processor (DSP), a group of processing components, or other suitable electronic processing components structured to control the operation of user computing device 102.

Memory 112 (e.g., RAM, ROM, NVRAM, Flash Memory, hard disk storage, etc.) may store data and/or computer code for facilitating at least some of the various processes described herein. In this regard, memory 112 may store programming logic that, when executed by processor 110, controls operations of user computing device 102. Network interface 114 may be structured to transmit and receive data from/to other devices, such as representative computing device 104, via the network described briefly above. Accordingly, network interface 114 can include a wireless network interface (e.g., 802.11X, ZigBee, Bluetooth, Internet, etc.), a wired network interface (e.g., Ethernet, USB, Thunderbolt, etc.), or any combination thereof. User interfaces 116 may include components that provide perceptible outputs (e.g., displays and light sources for visually-perceptible elements, a speaker for audible elements, and haptics for perceptible signaling via touch), and allow the user to provide inputs (e.g., a touchscreen, stylus, force sensor for, e.g., sensing pressure on a display screen, biometric components such as fingerprint reader, and microphone for detecting ambient sounds).

Memory 112 is also shown to include applications 118, which may include any sort of software that may be implemented by processor 110. For example, applications 118 can include an application configured to make and receive phone calls, an application configured to access websites, an application configured to send and receive e-mails or text messages, etc. In some embodiments, applications 118 includes an application distributed by a service provider (e.g., a bank) that allows a user to interact with one or more services or systems offered by the service provider. For example, the application may be a banking application, accessed via a smartphone, which allows the user to view account balances, transfer funds, etc. Said application may also allow a user to contact a service representative or file a complaint, directly within the application. In some cases, a first application (e.g., a banking application) may interface or call a second application (e.g., a phone call application) when a user indicates that he or she wishes to speak with a service representative. It will be appreciated that any sort of application may be implemented by user computing devices 102, and the examples described herein are not intended to be limiting.

Like user computing devices 102, representative computing devices 104 may also include any sort of mobile or non-mobile computing devices. However, representative computing devices 104 may generally be utilized by a service representative or agent (e.g., employed by a service provider) to respond to and resolve end-user complaints. In some embodiments, rather than being operated by a service representative (e.g., a person), representative computing devices 104 may implement automated or semi-automated services such as a chat bot, that can interact with a user (e.g., by prompting the user for information).

Representative computing devices 104 can include smartphones or other mobile phones, tablets, laptops, tablet, desktop computers, workstations, etc. Each representative computing device 104 is shown to include a processor 120, a memory 122, a network interface 124, and one or more user interfaces 126. In various embodiments, processor 120 is implemented as a general-purpose processor, an application specific integrated circuit (ASIC), one or more field programmable gate arrays (FPGAs), a digital signal processor (DSP), a group of processing components, or other suitable electronic processing components structured to control the operation of representative computing device 104.

Memory 122 (e.g., RAM, ROM, NVRAM, Flash Memory, hard disk storage, etc.) may store data and/or computer code for facilitating at least some of the various processes described herein. In this regard, memory 122 may store programming logic that, when executed by processor 120, controls operations of representative computing device 104. Network interface 124 may be structured to transmit and receive data from/to other devices, such as user computing device 102 and/or service provider computing system 106, via the network described briefly above. Accordingly, network interface 124 can include a wireless network interface (e.g., 802.11X, ZigBee, Bluetooth, Internet, etc.), a wired network interface (e.g., Ethernet, USB, Thunderbolt, etc.), or any combination thereof. User interfaces 126 may include components that provide perceptible outputs (e.g., displays and light sources for visually-perceptible elements, a speaker for audible elements, and haptics for perceptible signaling via touch), and allow the user to provide inputs (e.g., a touchscreen, stylus, force sensor for, e.g., sensing pressure on a display screen, biometric components such as fingerprint reader, and microphone for detecting ambient sounds).

Memory 122 is also shown to include applications 128, which may include any sort of software that may be implemented by processor 120. For example, similar to applications 118 described above, applications 128 can include an application configured to make and receive phone calls, an application configured to access websites, an application configured to send and receive e-mails or text messages, etc. In some embodiments, applications 128 include an application that presents one or more custom user interface, such as the interfaces described below with respect to FIGS. 6A and 6B. These interfaces may provide a variety of information to aid a service representative in resolving an end-user complaint. In some embodiments, applications 128 may interface with or call one or more resources of service provider computing system 106. For example, one or more of applications 128 may be application programming interfaces (APIs) that merely receive, interpret, and display data received from service provider computing system 106. It will be appreciated that any sort of application may be implemented by representative computing devices 104, and the examples described herein are not intended to be limiting.

Still referring to FIG. 1, service provider computing system 106 may receive end-user complaint data from representative computing devices 104, may process and/or store the end-user complaint data, and may retrieve end-user complaint data to be transmitted to representative computing devices 104. For example, end-user complaint data can be received as an audio file, a text file, etc. In some embodiments, service provider computing system 106 can also access end-user account information, including but not limited to account balances, transaction history, end-user contact information, etc. In some embodiments, service provider computing system 106 is implemented within a single computing device (e.g., one server, one housing, one computer, etc.). In various other embodiments, service provider computing system 106 can be distributed across multiple servers or computers (e.g., that can exist in distributed locations).

Service provider computing system 106 is shown to include a processor 130, a network interface 132, and a memory 134. In various embodiments, processor 130 is implemented as a general-purpose processor, an application specific integrated circuit (ASIC), one or more field programmable gate arrays (FPGAs), a digital signal processor (DSP), a group of processing components, or other suitable electronic processing components structured to control the operation of service provider computing system 106. In some embodiments, processor 130 may include multiple processing devices. Network interface 132 may be structured to transmit and receive data from/to other devices, such as representative computing device 104, via the network described briefly above. Accordingly, network interface 132 can include a wireless network interface (e.g., 802.11X, ZigBee, Bluetooth, Internet, etc.), a wired network interface (e.g., Ethernet, USB, Thunderbolt, etc.), or any combination thereof Although not shown in FIG. 1, service provider computing system 106 may also include one or more user interfaces (e.g., screens, keyboards, touchscreens, etc.) that allow a user to interact with service provider computing system 106.

Memory 134 (e.g., RAM, ROM, NVRAM, Flash Memory, hard disk storage, etc.) may store data and/or computer code for facilitating at least some of the various processes described herein. In this regard, memory 134 may store programming logic that, when executed by processor 130, controls operations of service provider computing system 106. Memory 134 is shown to include a data manager 136, configured to store, retrieve, and process a variety of data. More specifically, data manager 136 may be configured to receive complaint data from one or more representative computing devices 104 and can store the complaint data in a database 142, as well as to retrieve stored complaint data from database 142 for processing or viewing. While shown as an internal database to service provider computing system 106, database 142 may also be any other suitable database. For example, database 142 may be a portion of memory 134, or may be an external (i.e., remote) database hosted by another computing device (e.g., a server).

Data manager 136 may be configured to perform various operations using the complaint data and, in some embodiments, may also be configured to retrieve end-user data (e.g., account information, contact information, etc.) associated with the end-user making the complaint. For example, when an end-user contacts a service representative to place a complaint, data manager 136 may retrieve details associated with the end-user. This end-user information may be presented to the service representative (e.g., via an interface) to aid the service representative in determining an appropriate resolution.

Complaint data can generally include a variety of information relating to an end-user complaint. For example, complaint data can include an identifier for a complaint (e.g., a number, a string of characters, etc.), an indication of a type or category for the complaint, an indication of a service unit or service that the complaint relates to, an indication of a resolution for the complaint, comments regarding the complaint, a complaint summary, an indication of whether compensation was provided, an indication of the amount of compensation provide, and any other suitable information corresponding to an end-user complaint. Data for a single complaint may be referred to herein as a complaint log. In general, a complaint log will include at least an indication regarding whether compensation was provided and a text-based description of the complaint resolution.

Memory 134 is also shown to include a complaint analyzer 138. Complaint analyzer 138 may be configured to analyze complaint logs and generate a predicted resolution. More specifically, complaint analyzer 138 may determine, for a complaint log, whether the complaint should have been resolved by providing the end-user with compensation. To achieve this, complaint analyzer 138 implements natural language processing (NLP) to analyze a "resolution" field of a complaint log. Complaint analyzer 138 may first "clean" target complaint data, to prepare the data for executing a predictive model. Cleaning a complaint log may include removing stop words and finding the root of each word in the resolution comments field of the complaint log. For example, the words "checking," "checked," and "checks" may all be reduced to the root word "check." Additionally, cleaning the complaint log data may include removing characters and numbers, removing plural words or duplicate words, etc.

In some embodiments, complaint analyzer 138 first generates a list of key terms from one or more complaint logs. These key terms, also called unigrams, can be assembled in a matrix, as described below with respect to FIG. 5. Complaint analyzer 138 may determine how often each unigram is present in a particular complaint log, and may compare this determination with whether or not compensation was provided. For example, when analyzing a given complaint log in a training set of complaint logs, complaint analyzer 138 may first determine whether the complaint was closed with compensation. In this example, if the complaint was closed with compensation, complaint analyzer 138 may determine, for each unigram in the matrix, how many times the unigram appears in the resolution comments field of the complaint log. Similarly, complaint analyzer 138 may perform the same process for complaints that were closed without compensation. Complaint analyzer 138 may then determine how often each unigram is present in both scenarios, to further determine a list of unigrams that most accurately determine that compensation was provided.

Using this matrix of unigrams and the cleaned complaint data, complaint analyzer 138 may train a predictive model to generate predictions regarding whether or not compensation was provided. In some embodiments, the predictive model is a supervised, machine-learning model, and more specifically may be any suitable NLP model, such as a sequential, concurrent, or recurrent neural network. In some embodiments, the predictive model is a sequential neural network constructed using a Keras® application programming interface (API). In other embodiments, the predictive model is a logistic regression model, a Naïve Bayes Support vector machine, a fast text model, or a fine-tuning bidirectional encoder representations from transformers (BERT) model. It will be appreciated that all such NLP models are contemplated herein. In any case, the predictive model may be configured to generate a predicted resolution for each complaint log. More specifically, the predictive model will indicate a probability that a given complaint log should have been closed with compensation.

When training the predictive model, complaint analyzer 138 may compare the predicted resolution with an actual resolution for each complaint log. For example, each complaint log may indicate whether compensation was actually provided, such as by including a compensation field that indicates a one if relief was provided and a zero if relief was not provided. In a neural network, for example, training the model may include adjusting or modifying weights applied to one or more nodes of the model, in order to match the predicted resolutions with the actual resolutions. For example, a weight on an input node to the network may be increased or decreased to bring the predicted resolutions closer to the actual resolutions. It will be appreciated that any suitable training algorithms or techniques may be utilized. In some embodiments, the predictive model is trained using a supervised learning approach. For example, the model may be trained using backpropagation, gradient descent, support vector machines, logistic or linear regression, etc.

After the predictive model has been trained, complaint analyzer 138 may execute the trained model with new complaint logs (e.g., complaint logs that are not part of a training dataset) to predict resolutions for the new set of complaints. For each of the new complaint logs, complaint analyzer 138 may identify one or more key terms or unigrams, and/or may determine whether any of the unigrams in the previously generated unigram matrix are present in the new complaint log's resolution comments field.

In some embodiments, complaint analyzer 138 may also identify one or more additional complaints that are similar to a target complaint (e.g., a first complaint log or a complaint log being analyzed). More specifically, in some embodiments, complaint analyzer 138 may identify at least five similar complaints that can be linked to, stored with, or otherwise correlated to the target complaint. Identifying similar complaints to a target complaint can aid in manual reviews or audits, by allowing an auditor or other user to determine whether compensation was provided in these one or more additional complaints. Further, in some embodiments, the similar complaints may be provided in real-time to a service representative, to aid in the resolution process for a current complaint.

In some embodiments, memory 134 includes a transcriber 140, configured to transcribe an audio recording into text. More specifically, when an end-user initiates a call with a service representative (e.g., via user computing device 102), transcriber 140 may transcribe or convert the call audio into text in real-time or near real-time. In some embodiments, transcriber 140 may also transcribe previously recorded audio files associated with historic complaint logs (e.g., stored in database 142). In this regard, transcriber 140 may implement speech recognition techniques and, accordingly, may implement any suitable model, method, or algorithm for automatic speech recognition or speech-to-text. For example, transcriber 140 may include a neural network (e.g., deep feedforward, recurrent, etc.) configured to convert speech into a text file.

Figure 2:
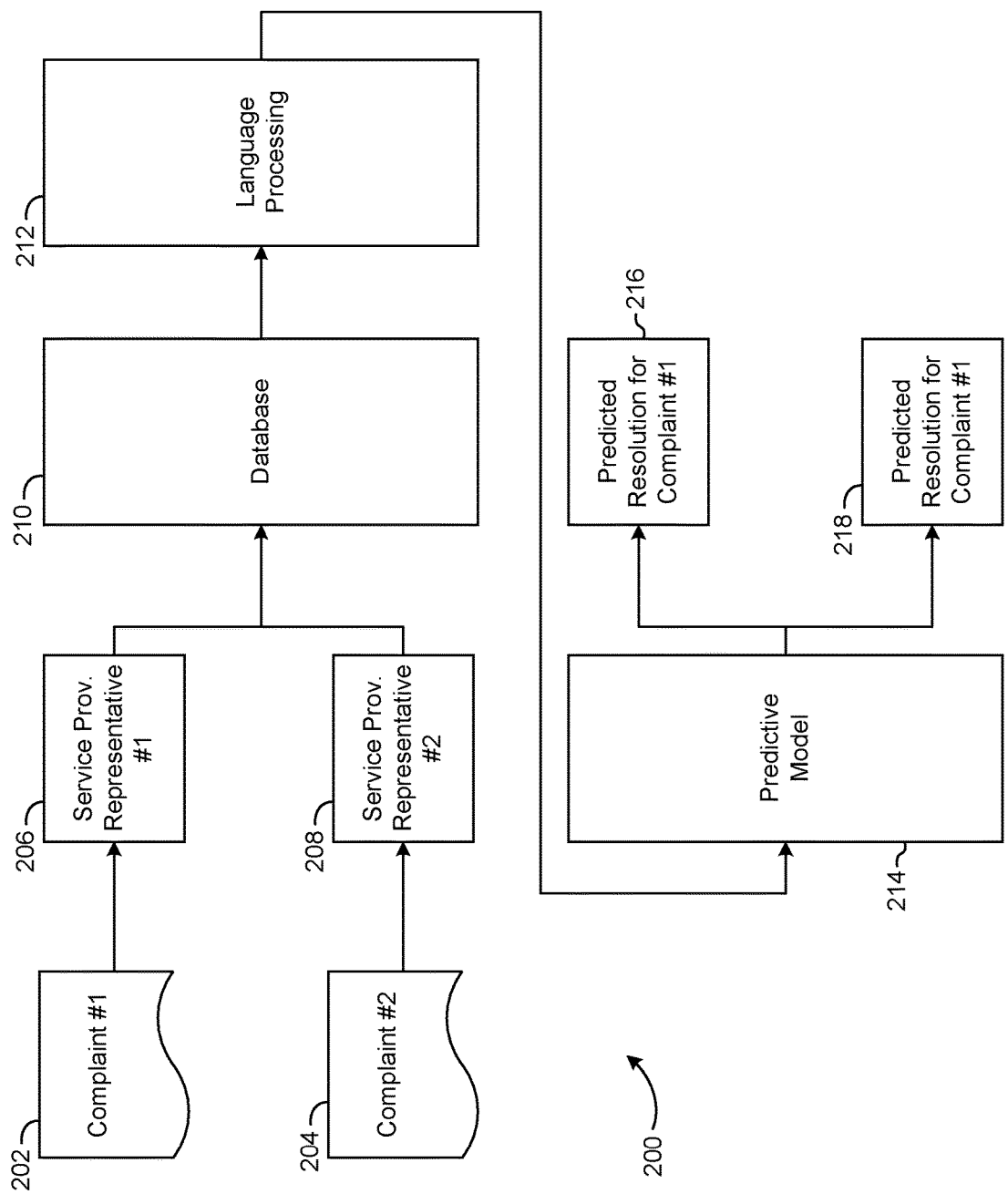
FIG. 2 is an example architecture for predicting resolutions to user complaints, according to some embodiments.

Referring now to FIG. 2, an example architecture 200 for predicting resolutions to end-user complaints is shown, according to some embodiments. Architecture 200 may be an example of an architecture implemented by system 100, for example. In some embodiments, various components of system 100 may implement one or more portions of architecture 200. It will be appreciated that architecture 200 may be implemented to process any number of complaint logs and, accordingly, generate any number of predictions.

Initially, a first complaint 202 ("Complaint #1") is received by a first service provider representative 206 ("Service Prov. Representative #1"), also known as a service representative. A second complaint 204 ("Complaint #2") may also be received by a second service provider representative 208 ("Service Prov. Representative #2"). In this example, complaints 202 and 204 may be received electronically (e.g., via email or a contact form) or, in some cases, may be received as a voice call. In other words, a first and/or a second end-user (e.g., of applications or websites that interface with, and/or are served by web servers of, an enterprise computing system) may call a service hotline or phone number to speak with a service representative. Representatives 206 and 208 may answer these end-user calls and, after determining that the end-user is calling with a complaint or grievance, may compile data for a complaint log. As described above, for example, a complaint log may identify a product, service, category, type, etc., associated with the complaint, and may also indicate the resolution for the complaint (e.g., in a resolution comments field).

In some embodiments, complaints 202 and 204 are received as text data (e.g., from a chat window or an email). In such embodiments, a user may interact (e.g., via a smart phone, smart speaker, etc.) with a chat bot or other automated service representative (e.g., virtual assistant) to submit a complaint, or simply to request information. As an example, the user may speak to a virtual assistant (e.g., by following a series of prompts) to request information, submit a complaint, etc., and a log (e.g., text or audio file) of the communication may be generated as one of complaints 202 and 204.

After generating complaint logs for each of complaints 202 and 204, representatives 206 and 208 can submit or otherwise transfer this complaint data (i.e., complaint logs) to a database 210. In some embodiments, database 210 is similar to database 142 described above. In database 210, the complaint logs may be stored, along with a plurality of additional, previously stored (i.e., historic) complaint logs. One or more of these complaint logs may be retrieved (e.g., by data manager 136), and the retrieved complaint logs may be processed using language processing 212 (e.g., via complaint analyzer 138).

Language processing 212 can include parsing the resolution comments field of each complaint log, prior to generating a predicted resolution. Parsing can include cleaning the complaint logs to remove stop words, find a root of each word, remove characters and numbers, and remove plural words or duplicate words, etc., as described above. Specifically, a resolution comments field, which generally includes text data describing the complaint and a resolution for the complaint, can be cleaned. Subsequently, a number of key terms may be identified by analyzing the cleaned resolution comments. These key terms can be assembled in a unigram matrix for further processing. For example, the unigram matrix can be analyzed to determine, for each complaint log, a number of times that each unigram in the matrix appears in the corresponding resolution comments field.

After parsing the resolution comments for key terms, a predictive model 214 may be executed using the key terms to generate predicted resolutions, indicating whether or not monetary compensation should be provided for a corresponding complaint. Predictive model 214, like the predictive model described above with respect to FIG. 1, may be any suitable model for natural language processing. In some embodiments, predictive model 214 determines a probability that monetary compensation is provided for a complaint based on the particular key terms present in the complaint log's resolution comments field. To do so, predictive model 214 may first be trained to identify key terms that are likely indicators of monetary compensation. For example, the term "fee" may be present in 95% of complaints that ended in monetary compensation being provided to an end-user. Accordingly, a complaint log that contains the word fee may have a high likelihood of requiring compensation.

A trained version of predictive model 214 may be executed to generate a first predicted resolution 216 corresponding to complaint 202, and a second predicted resolution 218 corresponding to complaint 204. Predicted resolutions 216 and 218 may include a probability that monetary compensation should be provided for the corresponding complaints. For example, predicted resolution may indicate that complaint 202 has a 92% chance of being resolved with compensation, based on an analysis of the resolution comments for complaint 202. Therefore, it is highly likely that complaint 202 should be resolved, or would have been resolved, with monetary compensation.

In some embodiments, predicted resolutions 216 and 218 may be presented to a user such as an auditor, a manager, a service representative, etc., via a user interface. For example, system 100 may generate a dashboard or a user interface that indicates, for one or more complaint logs, a predicted resolution. In some embodiments, predicted resolutions 216 and 218 may be utilized to generate a report that includes complaint logs, along with predicted and actual resolutions. Said report could be used to audit a service team, process, or representative, to determine whether end-users are being over- or under-compensated, or whether end-users that should be receiving monetary compensation are being missed.

Figure 3:
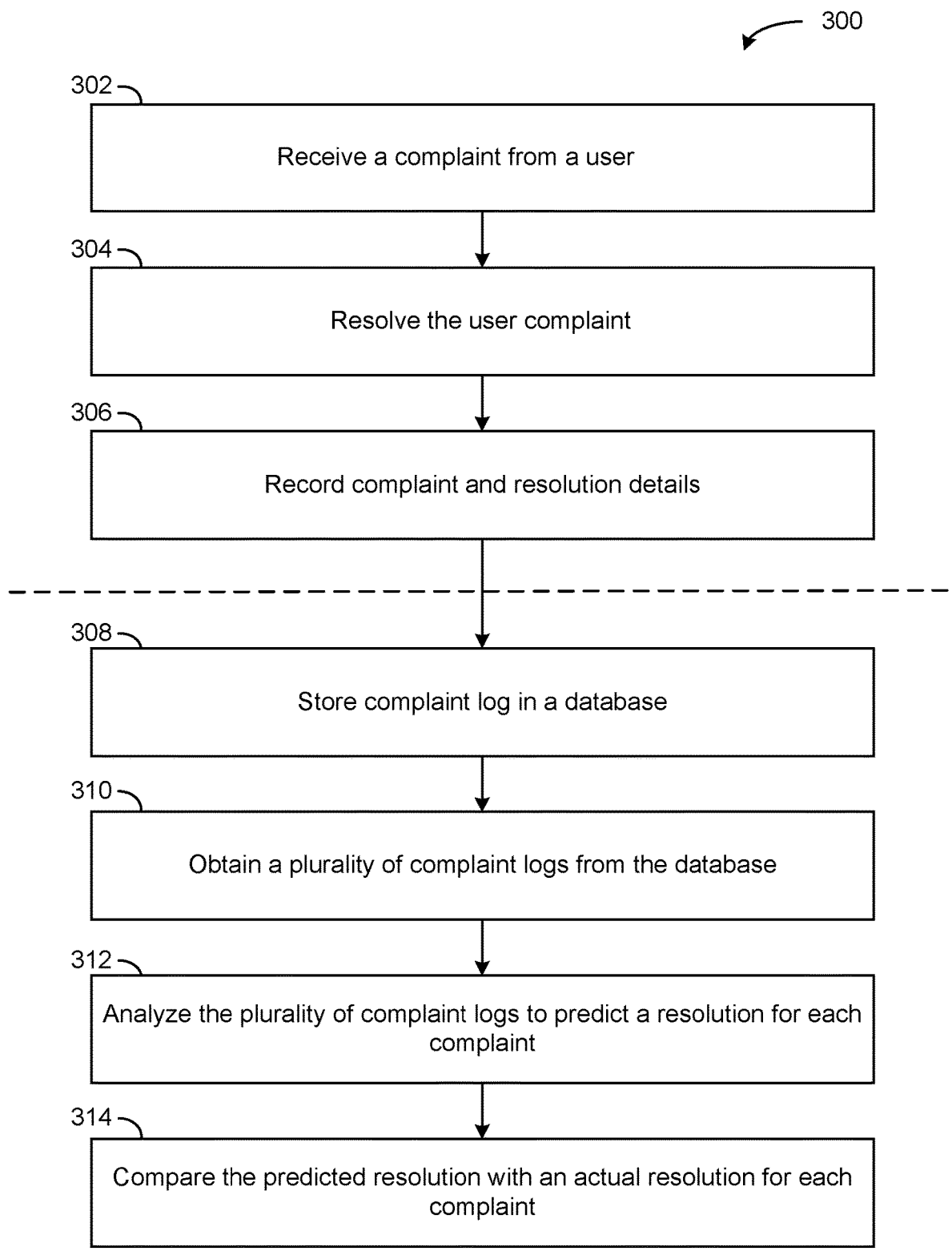
FIG. 3 is a flow diagram of a process for processing user complaints and predicting resolutions, according to some embodiments.

Referring now to FIG. 3, a process 300 for processing end-user complaints and predicting resolutions is shown, according to some embodiments. Process 300 can be implemented by the various components of system 100, in some cases. More specifically, steps 302 through 306 may be performed by a service representative operating a representative computing device 104, while steps 308 through 314 may be performed by service provider computing system 106. It will be appreciated that certain steps of process 300 may be optional and, in some embodiments, process 300 may be implemented using less than all of the steps.

At step 302, a complaint is received from an end-user. In some embodiments, the complaint is received digitally, such as through email, an online contact form, a text message, a chat (e.g., with a service representative or chat bot), etc. In other embodiments, the complaint is received from an end-user in an audio format (e.g., via phone call). For example, an end-user (e.g., of applications or websites that interface with, and/or are served by web servers of, an enterprise institution computing system) may log in to an account via a mobile banking application on the end-user's smart phone, and may navigate to a "Contact Us" portion of the application. From here, the end-user may choose a method to contact the enterprise's system. In some cases, the end-user may choose to call a service line, which may cause the mobile banking application to access a phone application on the end-user's mobile device. In another example, a user may communicate with a virtual assistant (e.g., via a smart speaker) which may record the conversation and/or may transcribed the user's responses (e.g., to prompts) in real-time, such as described below with respect to FIG. 4.

As discussed above, end-user complaints may often relate to fees or charges applied to a end-user's account. For example, an end-user may call to lodge a complaint against a late fee or any overdraft fee applied to the end-user's account. These end-user complaints are generally fielded by a team of service representatives, who may or may not be internal users of the enterprise computing system. In any case, service representatives may utilize a computing device (e.g., representative computing device 104) to receive and resolved end-user complaints, as well as to record complaint details. For example, a service representative may utilize a computer that can make, receive, and record (to generate audio files that may be analyzed) phone calls, and that includes an interface for entering complaint details. User interfaces presented by representative computing devices 104 are described in greater detail with respect to FIGS. 6A and 6B, below.

At step 304, the end-user complaint is resolved. In other words, the end-user and a service representative may come to an agreement to close the complaint process. In some embodiments, a complaint is resolved by agreeing to credit the end-user's account (i.e., providing compensation), often in response to a complaint for a fee or a charge. In some embodiments, a complaint is resolved without compensation. In other embodiments, the end-user and the service representative may not come to an agreement on the resolution, or the service representative may escalate the complaint to another department or to a supervisor.

At step 306, details of the complaint and the resolution are recorded by the representative computing device. In some embodiments, the service representative records at least an indication of the resolution (e.g., closed without compensation, closed with compensation, escalated, etc.), and provides a brief summary of the complaint and the resolution. The service representative may also record an indication of a type or category for the complaint, an indication of a service unit or service that the complaint relates to, an indication of the amount of compensation provide, and any other suitable information corresponding to an end-user complaint. This recorded information is generally referred to herein as a complaint log. The service representative may enter this information into the user interfaces described below, with respect to FIGS. 6A and 6B.

At step 308, the complaint log is stored in a database, such as database 142 described above. In this regard, the database may be a local database or a remote database. In some embodiments, as described above with respect to FIG. 2, complaint logs are stored in a database hosted by service provider computing system 106. In such embodiments, the complaint log may be transmitted from a representative computing device 104 to service provider computing system 106 via a network. A database may maintain complaint log records over a period of time, such that one or more complaint logs may be retrieved to perform additional processing, as described below.

At step 310, a plurality of previously stored complaint logs are retrieved from the database. The plurality of previously stored complaint logs, or a first set of complaint logs, may include one or more complaint logs that were previously recorded by a representative computing device and stored in the database. In some embodiments, these complaint logs include at least an indication of whether compensation was provided and a resolution comments field providing a text-based summary of the complaint and the resolution.

At step 312, the plurality of complaint logs are analyzed to predict a resolution for each complaint. More specifically, each of the first set of complaint logs is analyzed to predict whether or not compensation should have been provided. As a first step in analyzing the complaint logs, each complaint log (e.g., the complaint resolutions field of each complaint log) may be parsed to identify one or more key terms. These key terms may be assembled in a unigram matrix, similar to the example unigram matrix shown below, and the number of instances of each unigram in a corresponding complaint's resolution comments field may be identified and recorded. In the example unigram matrix shown below, a 1 would indicate that the unigram is present in the complaint's resolution comments field, while a 0 would indicate that the unigram is not present.

TABLE 1

Example Unigram Matrix

| Unigram | Complaint #1 | Complaint #2 | Complaint #3 |
| --- | --- | --- | --- |
| contact | 1 | 1 | 0 |
| user | 1 | 1 | 1 |
| who | 0 | 0 | 1 |
| identify | 1 | 1 | 0 |
| name | 1 | 1 | 1 |
| state | 0 | 1 | 0 |
| fee | 1 | 1 | 0 |

Once a unigram matrix is established, a predictive model may be executed based on the unigrams to determine a probability that a particular complaint should end in compensation for the end-user. Using the unigram matrix above as an example, the predictive model may indicate a high probability that complaints #1 and #2 should result in the end-user receiving compensation, while complaint #3 may have a low probability of ending in compensation. Analyzing the complaint logs using a predictive model is discussed below in greater detail, with respect to FIG. 5.

At step 314, the predicted resolution for each complaint is compared to the actual resolution to determine whether monetary compensation was properly provided. This comparison may be automatic, in some cases. For example, as the predictive model generates predictions, these predictions may be automatically compared to an actual resolution for a corresponding complaint log. In general, a match between the predicted and actual resolutions may be an indication that the complaint was handled correctly, while a mismatch between the predicted and actual resolutions may indicate that the end-user did not receive the compensation they deserved.

In some embodiments, the predicted and actual resolutions, along with the comparison between these resolutions, may be compiled into a report for a plurality of complaint logs. For example, a month's worth of complaint logs may be obtained at step 310 and analyzed at step 312 to generate a monthly report regarding a service team or system. The report may be beneficial for auditing the service processes and methods implemented by a team or by a company, to ensure that end-users are being fairly and adequately compensated for complaints. In some embodiments, an indication of the predicted and actual resolutions, the comparison, and/or a full copy of the report may be presented via a user interface. For example, a service supervisor may view any of this data via a custom dashboard or user interface.

Figure 4:
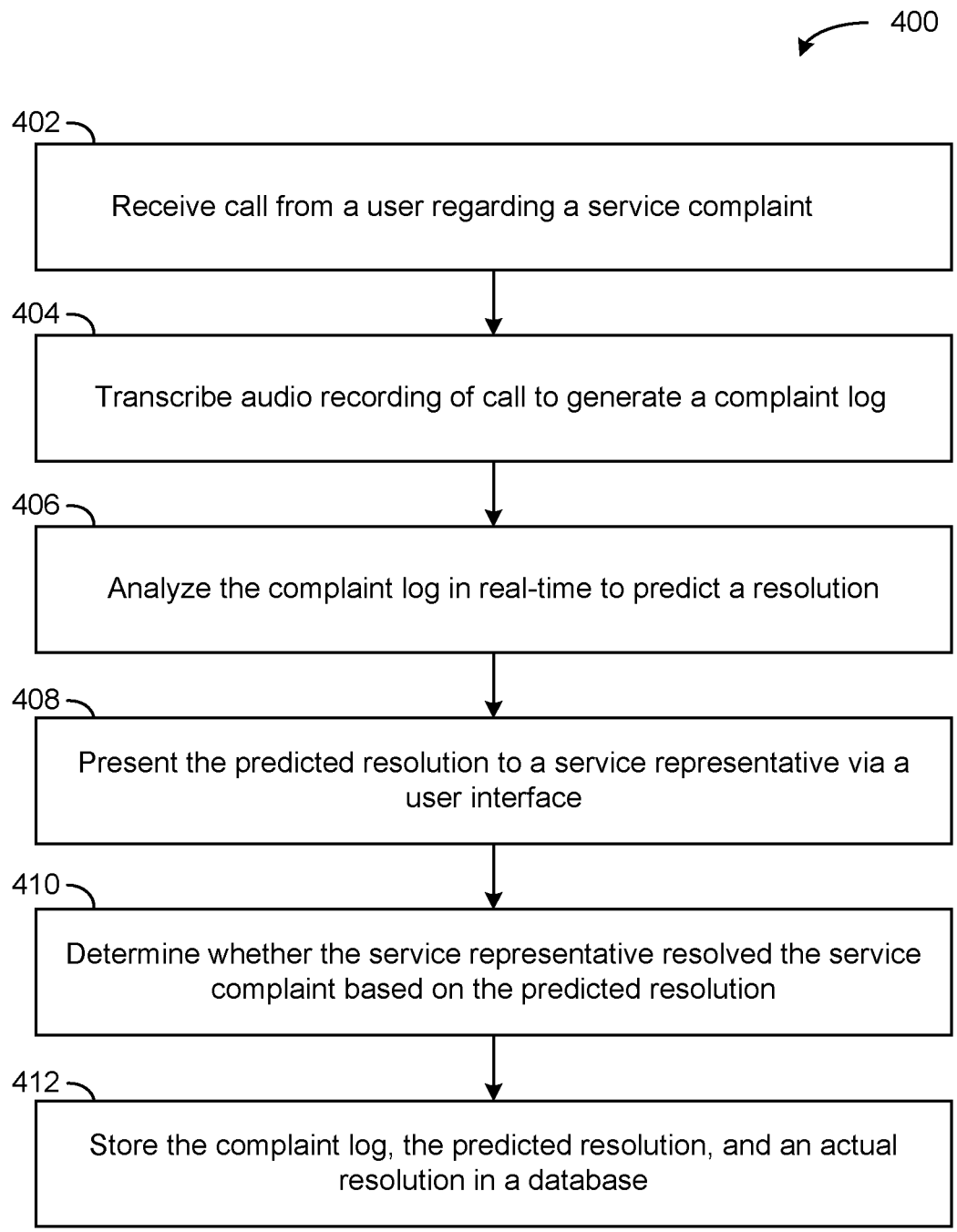
FIG. 4 is a flow diagram of a process for predicting resolutions to user complaints in real-time, according to some embodiments.

Referring now to FIG. 4, a process 400 for predicting resolutions to end-user complaints in real-time is shown, according to some embodiments. Predicting resolutions to end-user complaints in real-time may allow for more accurate and efficient resolutions. For example, process 400 may reduce or eliminate human error in resolving end-user complaints, and can help to ensure that all end-users are being treated fairly. Advantageously, process 400 can lead to improved end-user relations. Process 400 can be implemented by the various components of system 100, in some cases. It will be appreciated that certain steps of process 400 may be optional and, in some embodiments, process 400 may be implemented using less than all of the steps.

At step 402, a call is received from an end-user regarding a service complaint. In general, step 402 may be substantially similar to step 302 described above, with respect to FIG. 3. In other words, an end-user who may, for example, receive services via an enterprise computing system may employ a user computing device to initiate a call to a representative computing device using a service phone number (i.e., hotline) to speak with a service representative. In some cases, the end-user may be calling to dispute a fee or charge made on the end-user's account. A service representative, operating a representative computing device 104, can answer the call and discuss the complaint with the end-user.

At step 404, the call is transcribed in real-time, or near real-time, to generate a complaint log. In some embodiments, audio data (e.g., an audio file generated based on audio captured using a microphone or other recording device) from the call between the end-user and the service representative is processed by service provider computing system 106 as the call commences. The call may be transcribed by any suitable speech-to-text system or method (e.g., speech recognition software), as described above with respect to transcriber 140, for example. Transcribing the call may automatically convert the conversation into a text file or other text-based format. In this regard, a fully transcribed call may provide more robust data than the resolution comments field of a complaint log would alone. In some embodiments, the audio file may be analyzed to identify the speakers based on voice signatures available to the service provider computing system. In some embodiments, complaint data may be received in a text-based format, such as from a chat bot, an email, a contact form, etc. Accordingly, in such embodiments, step 404 may be skipped.

It will also be appreciated that, in some cases, user communications other than complaints may be received at step 402 and, accordingly, may be transcribed at step 404. For example, a user may contact a service representative to request information (e.g., regarding a product or account), as part of an advising session, to open or close an account, etc. Advantageously, any sort of user communication may be receive and/or transcribed to predict whether monetary relief should be provided. For example, it may be determined that a user calling to cancel an account (e.g., without submitting a complaint) should be offered monetary relief to maintain the account, rather than closing.

At step 406, the complaint log is analyzed to predict a resolution. Specifically, the text of the transcribed call may be parsed to determine a "clean" set of terms. Much like the cleaning described above, cleaning the transcribed call data can include removing stop words, finding the root of each word, removing characters and numbers, removing plural words or duplicate words, etc. In this regard, parsing the transcribed call can result in a list of root terms or unigrams that are present in the complaint log.

This list of root terms or unigrams may then be analyzed by a predictive model that implements some form of natural language processing, as described above. The predictive model may determine, based on the root terms or unigrams, a probability that the current complaint should be resolved by providing compensation to the end-user. For example, the predictive model may indicate that there is an 80% chance that the present complaint should end in compensation based on the key terms/unigrams. The analysis provided by the predictive model is described in greater detail below with respect to FIG. 5.

At step 408, the predicted resolution is presented to an end-user service representative via a user interface. As an example, the predicted resolution may be provided as a pop-up window or an overlay on a user interface of the service representative's device (e.g., representative computing device 104). In other example, the predicted resolution is provided as an indication or an alert, or an interface displayed on the service representative's device is updated to include the predicted resolution information. In some embodiments, the user interface can indicate whether or not compensation is recommended and may even indicate a recommended amount of compensation. For example, the interface may indicate that "Compensation is recommended. Would you like to apply the recommended amount of compensation?"

In some embodiments, one or more additional, previously stored complaint logs may also be identified based on their similarity to the present complaint log. For example, the one or more additional complaint logs may contain a certain percentage of similar key terms. These additional complaint logs may also be presented via a user interface, to allow the service representative to review similar complaints and determine how these similar complaints were resolved, giving the service representative greater insight for resolving the current complaint. In some embodiments, at least five additional, similar complaint logs are identified and presented to the service representative.

At step 410, it is determined whether the service representative resolved the complaint in accordance with the predicted resolution. For example, at step 408, the service representative may be presented with a prompt to accept the recommended resolution and/or a recommended compensation amount. The determination may indicate whether the service representative accepted the recommendation or chose to provide another resolution. In other words, at step 410, the actual resolution is determined.

At step 412, the complaint log, along with the predicted resolution and the actual resolution, is stored in a database. The complaint log may be updated with an indication of both the predicted and actual resolutions prior to being stored in the database. In some embodiments, an indication of whether the predicted and actual resolutions match may also be provided with the complaint log. Stored complaint logs may then be retrieved at a future time period for additional processing, report generation, auditing, etc.

Figure 5A:
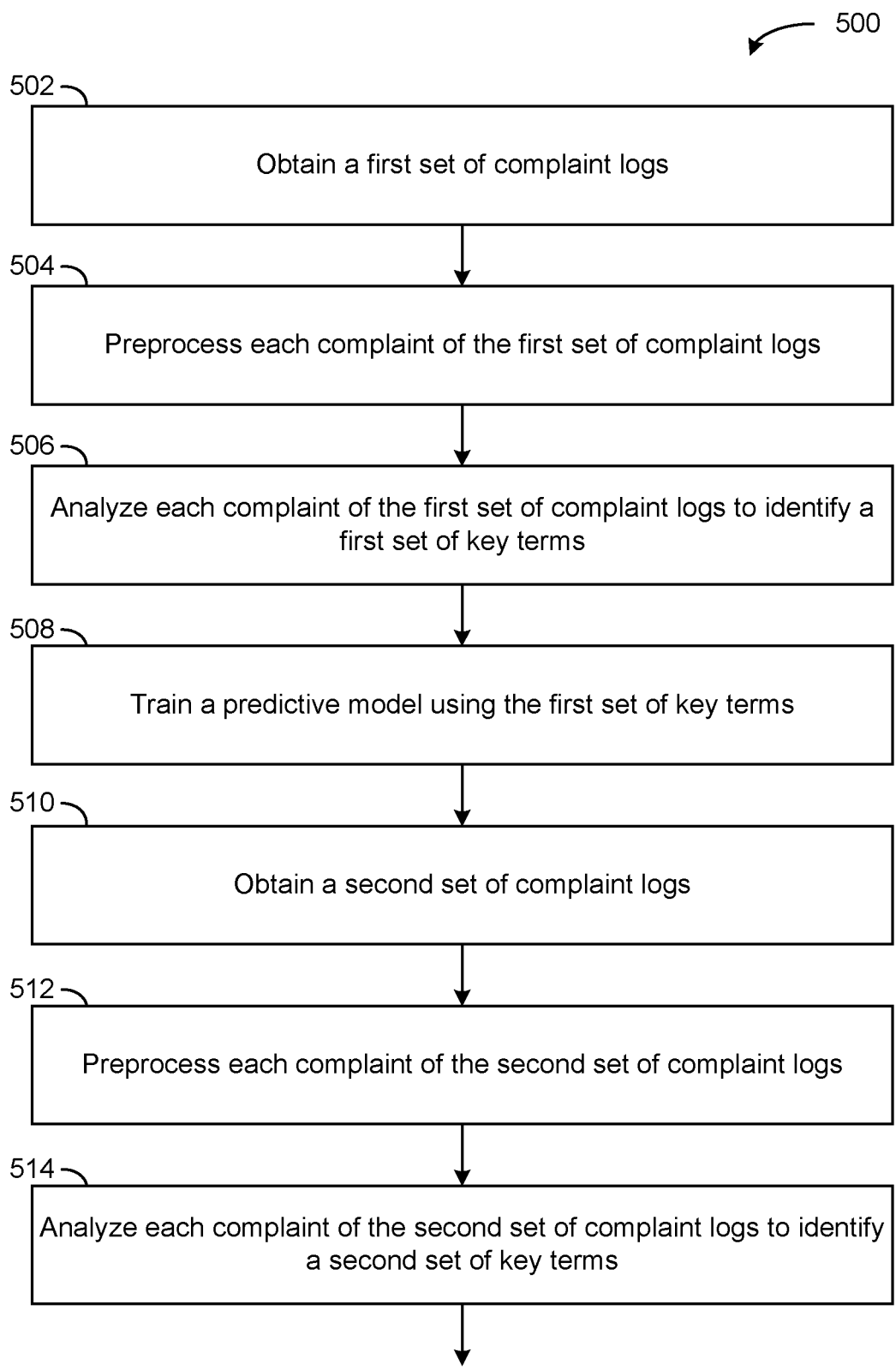
FIGS. 5A and 5B are a flow diagram of a process for training and implementing a predictive model for predicting complaint resolutions, according to some embodiments.
Figure 5B:
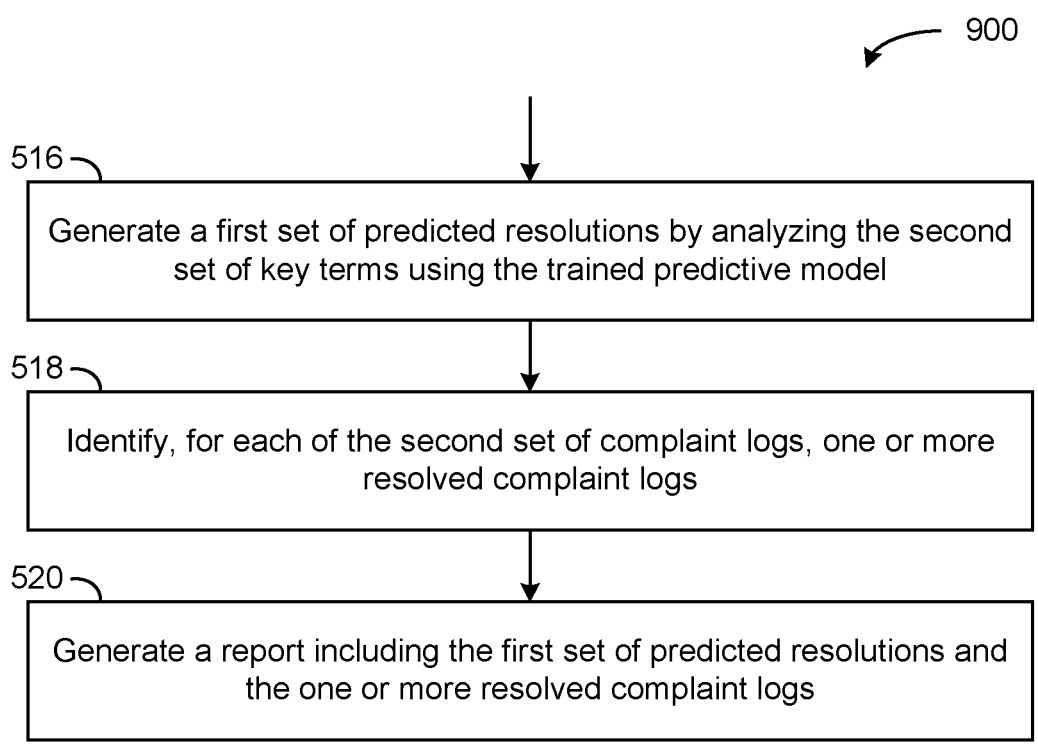

Referring now to FIGS. 5A and 5B, a process 500 for training and implementing a predictive model for predicting complaint resolutions is shown, according to some embodiments. Process 500 can be implemented by the various components of system 100, in some cases. Implementing process 500 to predict complaint resolutions can improve auditing of service systems and methods for a variety of enterprises. For example, process 500 can help to ensure that all end-users that deserve compensation are receiving said relief, and can help to ensure that other end-users are not being over-compensated or over-remediated. Additionally, comparing predicted resolutions to actual resolutions can provide an overview of the effectiveness of a service system, or even an individual service representative. It will be appreciated that certain steps of process 500 may be optional and, in some embodiments, process 500 may be implemented using less than all of the steps.

At step 502, a first set of complaint logs is obtained. In some embodiments, the first set of complaint logs is retrieved from a local or remote database. The first set of complaint logs may include one or more previously resolved complaints. As described above, each complaint log of the first set of complaints may include an indication of the resolution and a resolution comments field providing a textual description of the complaint and the resolution, among other information. In some embodiments, the first set of complaint logs is a portion of a larger set of complaint logs.

At step 504, each of the first set of complaint logs is preprocessed. Preprocessing may include a number of subprocessed that prepare the complaint logs for further processing. In some embodiments, preprocessing includes cleaning the resolution comments field of each complaint log. Cleaning, as described in detail above, includes removing stop words, finding the root of each word, removing characters and numbers, removing plural words or duplicate words, lemmatization, stemming, etc. In some embodiments, preprocessing also includes determining, for each complaint log, whether compensation was actually provided.

In some embodiments, preprocessing includes reformatting all, or a portion of, the data associated with a complaint log. For example, the resolution comments field of a given complaint log may be identified as an X variable and an actual resolution of the complaint may be identified as a Y variable, and these X and Y variables may be stored in a table. Complaint log data may also be reformatted in other ways, such as by modifying a data type or format, truncating the data, etc.

At step 506, the resolution comments field of each complaint log is analyzed to identify a first set of key terms. This analysis, referred to herein as parsing, can generate key a unigram matrix of key terms. The unigram matrix is a table that includes every unigram present in the resolution comments fields of the first set of complaint logs. The unigram matrix also indicates a frequency of each unigram. The frequency of unigrams may indicate a number of times each unigram appears in the first set of complaint logs and can also indicate a percentage of complaint logs that contain a given unigram. An example unigram matrix is shown below as Table 2.

TABLE 2

Example Unigram Matrix

| Unigram | count_0 | count_1 | percentage_0 | percentage_1 |
|---|---|---|---|---|
| custom | 72316 | 18895 | 0.808 | 0.911 |
| account | 37356 | 15265 | 0.418 | 0.736 |
| call | 32641 | 8264 | 0.365 | 0.399 |
| provid | 29280 | 8247 | 0.327 | 0.398 |
| inform | 28838 | 7744 | 0.322 | 0.374 |
| advis | 27743 | 7334 | 0.310 | 0.354 |
| advis | 27376 | 7385 | 0.306 | 0.356 |

Taking the first unigram shown in Table 2 as an example, the word "custom" was found 72,316 times in a first set of complaint logs when compensation was not provided (e.g., Y=0). In this example, there were total 89,471 complaints where compensation was not provided, therefore the "percentage 0" column as calculated as 72,316/89,471 =0.808, or 80.8% of complaints ending in no compensation for the end-user included the term "custom" in the resolution comments field. A similar calculation can be done to calculate the percentage of complaints that ended in compensation that included the term "custom" (e.g., 91.1%). In testing, it has been shown that certain key terms may provide a much higher probability of accurately predicting a resolution. For example, the term "fee" is shown to be highly effective in predicting that compensation should be provided.

At step 508, a predictive model is trained using the first set of key terms. The predictive model may be any suitable NLP model, such as a sequential, concurrent, or recurrent neural network. In other embodiments, the predictive model is a logistic regression model, a Naïve Bayes Support vector machine, a fast text model, or a fine-tuning bidirectional encoder representations from transformers (BERT) model. In some embodiments, the predictive model is a sequential neural network constructed using a Keras® application programming interface (API). An example network architecture for constructing this predictive model is shown below. However, it will be appreciated that all such NLP models are contemplated herein.

```
model = Sequential()
model.add(Dense(first_layer_nodes, activation='relu', input_dim=input_dim2))
model.add(Dropout(0.5))
model.add(Dense(1, activation='sigmoid'))
model. compile(loss='binary_crossentropy',
    optimizer='adam',
    metrics=['accuracy'])
```

Training the predictive model can ensure the model is generating accurate predictions, by adjusting weights on or more nodes of the model. For example, weights may be applied or adjusted to input nodes of a neural network, which would alter output values of the model. To train the model, the first set of complaint log data is fed through the model, and the output of the model (e.g., a probability that compensation should be provided) is compared to the actual resolution (e.g., whether compensation was actually provided). The goal of training the model is to closely match the predicted resolutions with the actual resolutions by adjusting weights on the nodes.

In some embodiments, after the model is trained, a portion of the first set of complaint logs defined as a test set (e.g., 15% of the first set of complaint logs) may be analyzed using the trained predictive model to further refine the model and to determine how accurate the model is in predicting resolutions. After constructing and training the predictive model, output data (e.g., predictions) can be "bucketed" or sorted into one or more groups of output probabilities. For example, output predictions can be separated into five separate "buckets" (e.g., probabilities of 0.0-0.2, 0.2-0.4, etc.). In testing, it was found that buckets corresponding to probabilities 0.4-0.6 and 0.6-0.8 contained only a small amount of data and had roughly 50% accuracy. The remaining buckets included approximately 95% of the output data and had an accuracy of over 96%.

At step 510, a second set of complaint logs is obtained. Like step 502, the second set of complaint logs is retrieved from a local or remote database, and includes one or more previously resolved complaints. Each complaint log of the second set of complaints may include an indication of the resolution and a resolution comments field providing a textual description of the complaint and the resolution, among other information. Unlike the first set of complaint logs, however, the second set of complaint logs may be analyzed using a trained predictive model, as described below.

At step 512, each of the second set of complaint logs is preprocessed. Preprocessing may include a number of sub-processed that prepare the complaint logs for further processing, as described above at step 504. In this regard, step 512 may be substantially similar to, or the same as, step 504. The resolution comments field of each complaint of the second set of complaint logs is cleaned, reformatted, etc., to place the second set of complaint logs in condition for further processing.

At step 514, the resolution comments field of each complaint log is analyzed to identify a second set of key terms. Again, step 514 may be substantially similar to, or the same as, step 506 described above. In other words, the resolution comments field of each complaint log of the second set of complaint logs is parsed to generate a unigram matrix of terms. In some embodiments, however, step 514 may be skipped when processing the second set of complaint logs. For example, the key terms may be previously established (e.g., the most useful terms for predicting resolutions have been previously identified). In this case, at step 514, the terms contained in the resolution comments field of each complaint log may simply be identified and formatted into a graph structure. Additionally, the frequency of each identified term may be determined.

At step 516, a set of predicted resolutions is generated by executing the trained predictive model based on the second set of key terms. In other words, the unigrams/words identified at step 514 may be fed through the trained predictive model to generate an output for each complaint log. The output may take the form of a probability that the corresponding complaint log should be resolved with compensation. For example, if the output for a first complaint log is 0.95, it is highly likely that the complaint should have been resolved with compensation. Likewise, a second complaint log with a probability of 0.1 would likely not have been resolved with compensation.

In some embodiments, a predicted resolution may only be provided if the probability is above or below a certain threshold. For example, probabilities between −1.0 and 0.4 may be highly accurate (e.g., >85%) in determining that compensation should not be provided, while probabilities between 0.8 and 1.0 may almost certainly indicate that compensation should be provided. Probabilities that do not fall in these ranges (e.g., probabilities between 0.4 and 0.8) may be determined to be too inaccurate to warrant a prediction. Accordingly, complaint logs with a probability that does not fall with the threshold range(s) may be ignored, or flagged for manual review.

At step 518, for each of the second set of complaint logs, one or more additional, previously resolved complaint logs are identified. These previously resolved complaints may be retrieved from a database (e.g., database 142) and may be substantially similar a corresponding one of the second set of complaint logs. In some embodiments, similar complaint logs are identified based on the key terms present in each log. For example, two complaint logs that include a significant number of similar key terms (e.g., above a threshold number or a threshold percentage) may be indicated as similar. It will be appreciated, however, that other techniques may be used to identify one or more complaint logs that are similar to a target complaint log. These additional complaint logs may be tagged, linked, or saved with a corresponding one of the second set of complaint logs.

In some embodiments, the one or more additional complaint logs are identified after comparing the predicted resolutions for each of the second set of to an actual resolution. In such embodiments, a disagreement between the actual and predicted resolution for a complaint log may cause the retrieval or identification of the additional complaint logs. For example, a first complaint log may have a predicted resolution of "compensation should be provided," while the first complaint log's actual resolution may be indicated as "no compensation provided." In this example, the disagreement between the actual and predicted resolution may cause system 100 to identify additional complaint logs that are similar to the first complaint log, such as to aid in a manual review process. Accordingly, an auditor or other user may utilize the additional complaint logs to determine whether the first complaint log was closed appropriately.

At step 520, a report including the predicted resolutions for the second set of complaint logs is generated. More specifically, the report can include a variety of information for each complaint log, including the resolution comments, an actual resolution, and the predicted resolution. The report can also identify one or more complaint logs that have a mismatch between the predicted and actual resolution. In this manner, the report may indicate a subset of the second set of complaint logs that may need manual review or auditing to determine whether the end-user was fairly compensated. Advantageously, identifying just a small portion of complaint logs to review may significantly reduce audit time.

In some embodiments, the complaint logs (e.g., including the predicted resolutions) may be presented via a graphical user interface. For example, the complaint logs may be utilized to generate a dashboard or a user interface that includes graphical elements for displaying data. For example, a user interface could include a graph that illustrates how many complaints are closed with compensation, how many complaints are resolved properly (e.g., in-line with a predicted resolution), etc. These user interfaces may be presented via a user device such as a representative computing device, or a third-party or remote device that can access the service provider computing system 106.

Figure 6B:
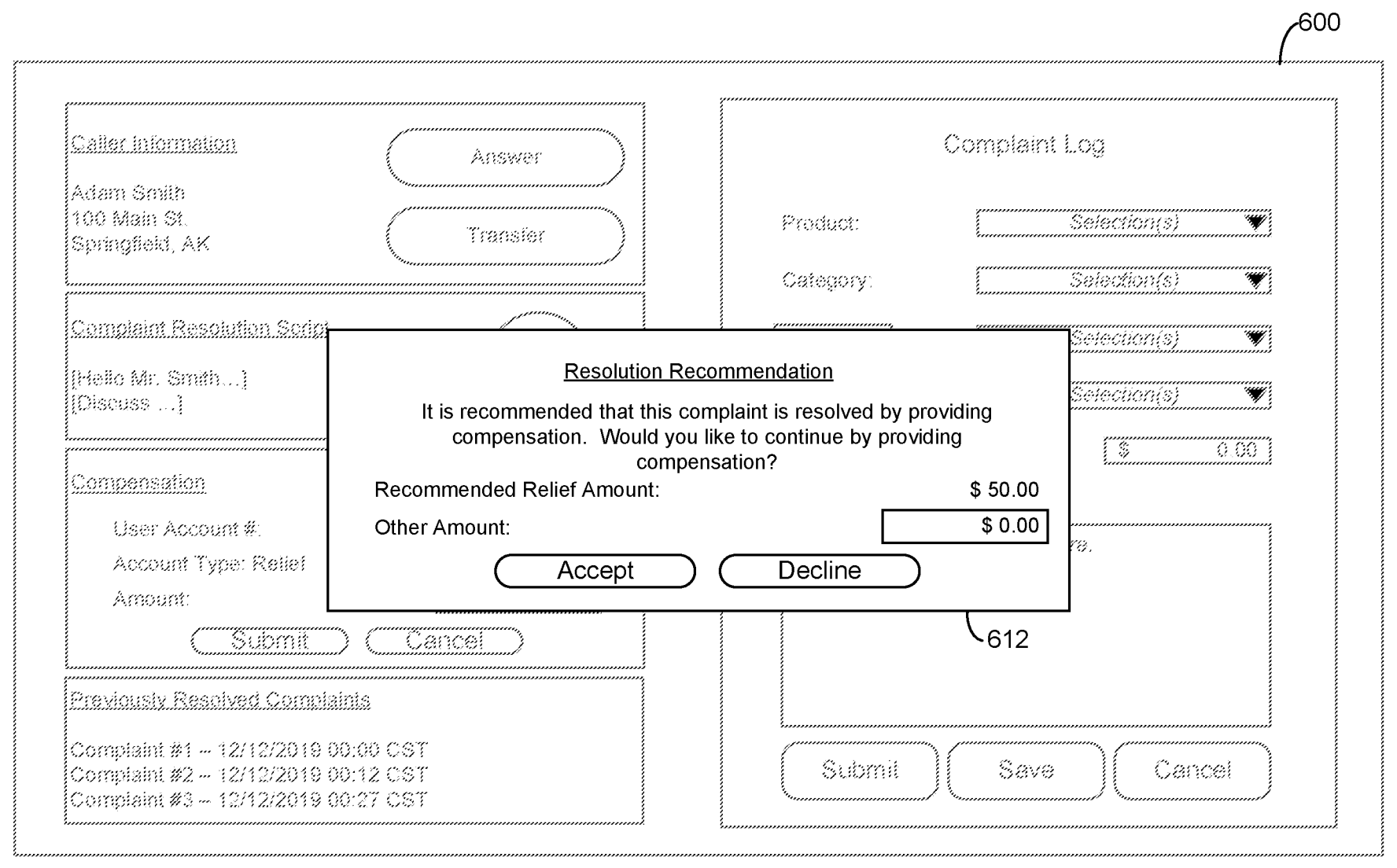

Referring now to FIGS. 6A and 6B, example user interfaces presented to a service provider service representative to resolve end-user complaints are shown, according to some embodiments. These example user interfaces may be displayed on a user interface of representative computing devices 104, for example, any may allow a service representative to efficiently and uniformly respond to end-user complaints. In this regard, the example interface described below may provide a wide variety of information to aid a service representative in reaching a complaint resolution, and in recording the complaint resolution process. It will be appreciated that any of the interfaces described herein may include more or fewer elements than those shown in FIGS. 6A and 6B, and that the elements shown are not intended to be limiting. In this regard, the interfaces described below may be customized for a variety of implementations.

Turning first to FIG. 6A, an example interface 600 is shown, that includes a number of graphical elements or sub-interfaces. A caller information element 602 is shown to provide information regarding a caller (e.g., an end-user), such as the caller's name, address, phone number, etc., although it will be appreciated that caller information element 602 is not limited to providing just this example information. For example, in some cases, caller information is retrieved from a local database (e.g., an enterprise computing system's internal database), and can include more detailed information such as account numbers, account balances, etc. A service representative may also be presented with the option to answer the caller and/or to transfer the call. For example, the service representative may transfer a caller to a specific department depending on a request or a complaint.

Interface 600 is also shown to include a complaint resolution script element 604, which presents a script that the service representative can follow when responding to an end-user's complaint. In some embodiments, the complaint resolution script may be dynamically generated based on the end-user's particular complaint, or based on a type of complaint. In some embodiments, the service representative could choose the complaint resolution script, or may select various options to dynamically update the script throughout the conversation. Additionally, complaint resolution script element 604 is shown to include an icon (e.g., a button) that the service representative can select to record the phone call. However, in some embodiments, the phone call may be automatically recorded.

Interface 600 further includes a compensation element 606, from which the service representative can provide compensation to the end-user. In other words, the service representative can enter an amount of compensation via compensation element 606 and can select a submit icon to submit the request relief payment, or can select a cancel icon to cancel the provision of compensation. From compensation element 606, the service representative can also identify the end-user's account number and account type. The account number and type may be automatically populated when the end-user is identified during initialization of the call. For example, a service provider's computing system can query a database for end-user information based on the end-user's name or phone number. In other embodiments, the service representative may manually enter or select the end-user's account.

Interface 600 can include a previously resolved complaints element 608. Resolved complaints element 608 can include a list of previously resolved or closed complaint logs, and can provide additional information such as a date and time that the complaint was resolved. In some embodiments, a service representative can select a particular complaint from this list to view additional information, such as the actual resolution (e.g., compensation or no compensation) and comments regarding the resolution. In this regard, viewing resolved complaint logs may aid the service representative in determining a resolution for the present caller. In some embodiments, resolved complaints element 608 may also present complaint logs that are similar to the present complaint. For example, the call may be transcribed and analyzed in real-time, as described with regards to FIG. 4 above, and one or more historical complaints that are similar to the present complaint may be identified.

The service representative may also utilized a complaint log element 610, for entering various details regarding the present caller's complaint. As shown, for example, the service representative can identify a product, category, and/or type associated with the complaint. Once a resolution is reached, the service representative may also indicate a general category for the resolution. For example, the service representative may indicate that the complaint was closed "with compensation," "without compensation," or "with comments." As another example, the service representative may indicate that the complaint was escalated or transferred to another department. It will be appreciated that the service representative may select any of these options via any suitable graphical element. For example, FIG. 6A shows each of these selections as drop-down menus; however, the service representative may also enter a product, category, type, and resolution in another manner, such as via a text box. It will also be appreciated that interface 600 is not limited to just the above-described fields. Rather, complaint log element 610 may be customized based on a particular implementation, or may be dynamically modified based on the end-user's complaint.

If a complaint is closed with some sort of compensation (e.g., submitted via compensation element 606), the service representative can enter the amount of relief provided in a text box or other similar field. In some embodiments, the amount of relief provided may be automatically populated once the service representative submits a relief request. As shown, for example, the service representative may submit a $50.00 relief payment, and the "compensation provided" field of complaint log element 610 may be automatically populated to display $50.00.

Additionally, the service representative may enter any sort of comments, notes, or other text via a "comments" text box. Here, the service representative may summarize the phone call and/or may indicate why a particular resolution was reached. For example, the service representative may indicate that "the end-user had reasonable points and we decided to reimburse the end-user $50.00 to cover an overdraft charge." In general, the comments entered into the "comments" field of complaint log element 610 are saved as the resolution comments of a complaint log, as described above.

Once a complaint is fully documented (e.g., once all of, or at least a particular portion, the fields of complaint log element 610 are populated), the service representative can select a submission icon to submit the complaint log. Submitting the complaint log may save the complaint log to a local and/or remote memory, and may queue the complaint log for further processing at a service provider's computing system. Choosing instead to save the complaint log may save the complaint log locally, so that the service representative might review and/or edit the log before submission. In some case, the service representative may also choose to cancel the current complaint log, thereby clearing the various fields of complaint log element 610.

In some embodiments, a call may be transcribed and analyzed in real-time, as described with regards to FIG. 4 above. In such embodiments, the transcribed call log may be analyzed to identify key terms and these key terms may be utilized to execute a predictive model. In other embodiments, portions of the complaint log may be analyzed in real-time, such as while the service representative is populating the various field of complaint log element 610. The output of the predictive model is generally a predicted resolution, as described above. The predicted resolution may be provided in real-time or near real-time to a service representative, such as via a pop-up window 612, shown in FIG. 6B. Window 612 may be an overlay, a second interface, or any other graphical element that is displayed over, or in place of, interface 600.

In the example shown in FIG. 6B, window 612 indicates to a service representative that it is recommended to resolve the present complaint with compensation. In some embodiments, as shown, window 612 may also present a recommend amount of relief. The recommended amount of relief may be determined in any manner, such as by analyzing past, resolved complaints logs that are similar to the present complaint log, or by determining the particular fee or charge being disputed. For example, if the end-user is calling to dispute a late fee that is set at $37.00, the service representative may be presented the option to provide $37.00 in compensation. In some embodiments, the service representative may also enter a custom compensation amount in a text body or other similar field. The service representative may then accept the recommended resolution, or may choose to decline the resolution.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A service provider computing system comprising memory having stored thereon instructions that, when executed by one or more processors, cause the one or more processors to:
   receive, during a call between a user and a representative, audio data of the call and analyze the audio data to obtain a textual representation of at least a portion of the call;
   parse the textual representation to identify one or more key terms corresponding to a complaint by the user;
   execute a machine-learning predictive model using the one or more key terms as input to generate a prediction indicating whether the complaint should have compensation, the machine- learning predictive model being a supervised machine learning model configured to accept terms from parsed text as inputs and to output compensation predictions, the machine-learning predictive model trained using a training dataset comprising historical key terms extracted from a plurality of historical complaint logs and a corresponding plurality of historical resolutions;
   provide, during the call, to a computing device of the representative, a prompt indicative of the prediction;
   identify an indication of whether compensation was provided for the complaint; and
   update the machine-learning predictive model based on the indication responsive to determining that the indication does not match the prediction indicating whether the complaint should have compensation.

2. The system of claim 1, wherein parsing the textual representation comprises generating a unigram matrix, the unigram matrix indicating a frequency of each unigram.

3. The system of claim 1, wherein the instructions further cause the one or more processors to generate a report including a probability that the complaint should have compensation.

4. The system of claim 3, wherein the report is generated only if the probability exceeds a threshold.

5. The system of claim 1, wherein the instructions further cause the one or more processors to generate a report that is indicative of an amount of compensation provided for similar past complaints.

6. The system of claim 1, wherein parsing the textual representation comprises at least one of removing any numerical values, removing any repeated words, or identifying a root of each word.

7. The system of claim 1, wherein executing the machine-learning predictive model comprises generating, for the complaint, a probability that the user should receive compensation.

8. The system of claim 1, wherein the instructions further cause the one or more processors to identify one or more past complaints for being similar based on the prediction, and presenting information corresponding to the one or more past complaints.

9. The system of claim 8, wherein the information is indicative of compensation resulting from the one or more past complaints.

10. The system of claim 1, wherein the instructions further cause the one or more processors to identify at least one past complaint based on the one or more key terms.

11. The system of claim 1, wherein the instructions further cause the one or more processors to:
    obtain a second set of complaint logs, each complaint log of the second set of complaint logs comprising a second resolution comments field and a second indication whether compensation was provided;
    parse, for each complaint log of the second set of complaint logs, the second resolution comments field to generate a unigram matrix for the second set of complaint logs; and
    execute the trained machine-learning predictive model based on the unigram matrix for the second set of complaint logs to generate a second prediction indicating whether compensation should be provided for each complaint log of the second set of complaint logs.

12. The system of claim 1, wherein the machine-learning predictive model comprises a sequential neural network.

13. The system of claim 1, wherein the machine-learning predictive model comprises a bidirectional encoder representations from transformers (BERT) model.

14. The system of claim 1, wherein the prediction is a probability that the complaint should result in compensation.

15. A method implemented by a computing system comprising one or more processors, the method comprising:
    receiving, during a call between a user and a representative, audio data of the call and analyzing the audio data to obtain a textual representation of at least a portion of the call;
    parsing the textual representation to identify one or more key terms corresponding to a complaint by the user;
    executing a machine-learning predictive model using the one or more key terms as input to generate a prediction indicating whether the complaint should have compensation, the machine-learning predictive model being a supervised machine learning model configured to accept terms from parsed text as inputs and to output compensation predictions, the machine- learning predictive model trained using a training dataset comprising historical key terms extracted from a plurality of historical complaint logs and a corresponding plurality of historical resolutions;
    providing, during the call, to a computing device of the representative, a prompt indicative of the prediction;

identifying an indication of whether compensation was provided for the complaint; and updating the machine-learning predictive model based on the indication responsive to determining that the indication does not match the prediction indicating whether the complaint should have compensation.

16. The method of claim 15, further comprising generating, by the one or more processors, a report including a probability that the complaint should have compensation.

17. The method of claim 15, further comprising generating, by the one or more processors, a report including an indication of an amount of compensation provided for similar complaints.

18. The method of claim 15, further comprising identifying, by the one or more processors, one or more past complaints for being similar based on the prediction, and presenting information corresponding to the one or more past complaints.

* * * * *